(12) United States Patent
LaPlante et al.

(10) Patent No.: US 6,904,344 B2
(45) Date of Patent: Jun. 7, 2005

(54) SEMI-ACTIVE SHOCK ABSORBER CONTROL SYSTEM

(75) Inventors: John A. LaPlante, Willington, CT (US); William T. Larkins, Manchester, NH (US)

(73) Assignee: ActiveShock, Inc., Manchester, NH (US)

( * ) Notice: Subject to any disclaimer, the term of this patent is extended or adjusted under 35 U.S.C. 154(b) by 0 days.

(21) Appl. No.: 10/838,680

(22) Filed: May 4, 2004

(65) Prior Publication Data

US 2004/0254701 A1 Dec. 16, 2004

Related U.S. Application Data

(63) Continuation of application No. 10/341,129, filed on Jan. 13, 2003, now Pat. No. 6,732,033.
(60) Provisional application No. 60/347,662, filed on Jan. 11, 2002.

(51) Int. Cl.⁷ .............................. G06F 7/00; B60G 17/00; B60G 23/00
(52) U.S. Cl. .............................. 701/37; 701/38; 280/5.5
(58) Field of Search ....................... 701/37, 38; 280/5.5, 280/5.515, 5.514

(56) References Cited

U.S. PATENT DOCUMENTS

| | | | |
|---|---|---|---|
| 3,807,678 A | 4/1974 | Karnopp et al. | 248/358 R |
| 4,634,142 A | 1/1987 | Woods et al. | 280/707 |
| 4,722,548 A | 2/1988 | Hamilton et al. | 280/707 |
| 4,867,475 A | 9/1989 | Groves | 280/707 |
| 4,887,699 A | 12/1989 | Ivers et al. | 188/378 |
| 4,923,038 A | 5/1990 | Lizell | 188/299 |
| 4,936,425 A | 6/1990 | Boone et al. | 188/299 |
| 5,024,302 A | 6/1991 | Karnopp | 188/299 |
| 5,024,460 A | 6/1991 | Hanson et al. | 280/707 |
| 5,276,622 A | 1/1994 | Miller et al. | 364/424.05 |
| 5,276,623 A | 1/1994 | Wolfe | 364/424.05 |
| 5,390,121 A | 2/1995 | Wolfe | 364/424.05 |
| 5,440,488 A * | 8/1995 | Yamaoka et al. | 701/37 |
| 5,559,700 A | 9/1996 | Majeed et al. | 364/424.15 |
| 5,582,385 A | 12/1996 | Boyle et al. | 248/550 |
| 5,652,704 A | 7/1997 | Catanzarite | 364/424.059 |
| 5,682,968 A | 11/1997 | Boichot et al. | 188/299 |
| 5,692,587 A | 12/1997 | Fratini, Jr. | 188/299 |
| 5,712,783 A | 1/1998 | Catanzarite | 364/424.046 |
| 5,732,370 A | 3/1998 | Boyle et al. | 701/37 |
| 5,828,970 A * | 10/1998 | Kimura et al. | 701/37 |
| 5,862,894 A | 1/1999 | Boichot et al. | 188/280 |
| 5,890,081 A * | 3/1999 | Sasaki | 701/37 |
| 5,897,130 A | 4/1999 | Majeed et al. | 280/707 |
| 5,908,456 A | 6/1999 | Wahlers | 701/37 |
| 5,975,508 A | 11/1999 | Beard | 267/136 |
| 6,049,746 A | 4/2000 | Southward et al. | 701/37 |
| 6,070,681 A | 6/2000 | Catanzarite et al. | 180/89.15 |
| 6,097,999 A | 8/2000 | Shal et al. | 701/38 |
| 6,112,866 A | 9/2000 | Boichot et al. | 188/299.1 |
| 6,226,581 B1 | 5/2001 | Reimann et al. | 701/48 |
| 6,311,110 B1 | 10/2001 | Ivers et al. | 701/37 |
| 6,604,751 B2 | 8/2003 | Fox | 280/276 |

* cited by examiner

Primary Examiner—Yonel Beaulieu
(74) Attorney, Agent, or Firm—Grossman Tucker Perreault & Pfleger, PLLC

(57) ABSTRACT

A semi-active control methodology is provided for a spring/mass system, for example a real-time adjustable shock absorber system. The methodology includes defining a plurality of operating zones based on system parameters and user-definable or preset inputs. The methodology also includes processing to account for non-inertial spring/mass system response and multidimensional forces acting on the system, and an acceleration hedge calculation to accurately define system operation at extrema of travel. The methodology is generally directed at producing a plurality of valve control signals, selecting among the valve control signals, and applying the selected control signal to the valve in a closed-loop feedback system to adjust the energy in the spring/mass system.

35 Claims, 9 Drawing Sheets

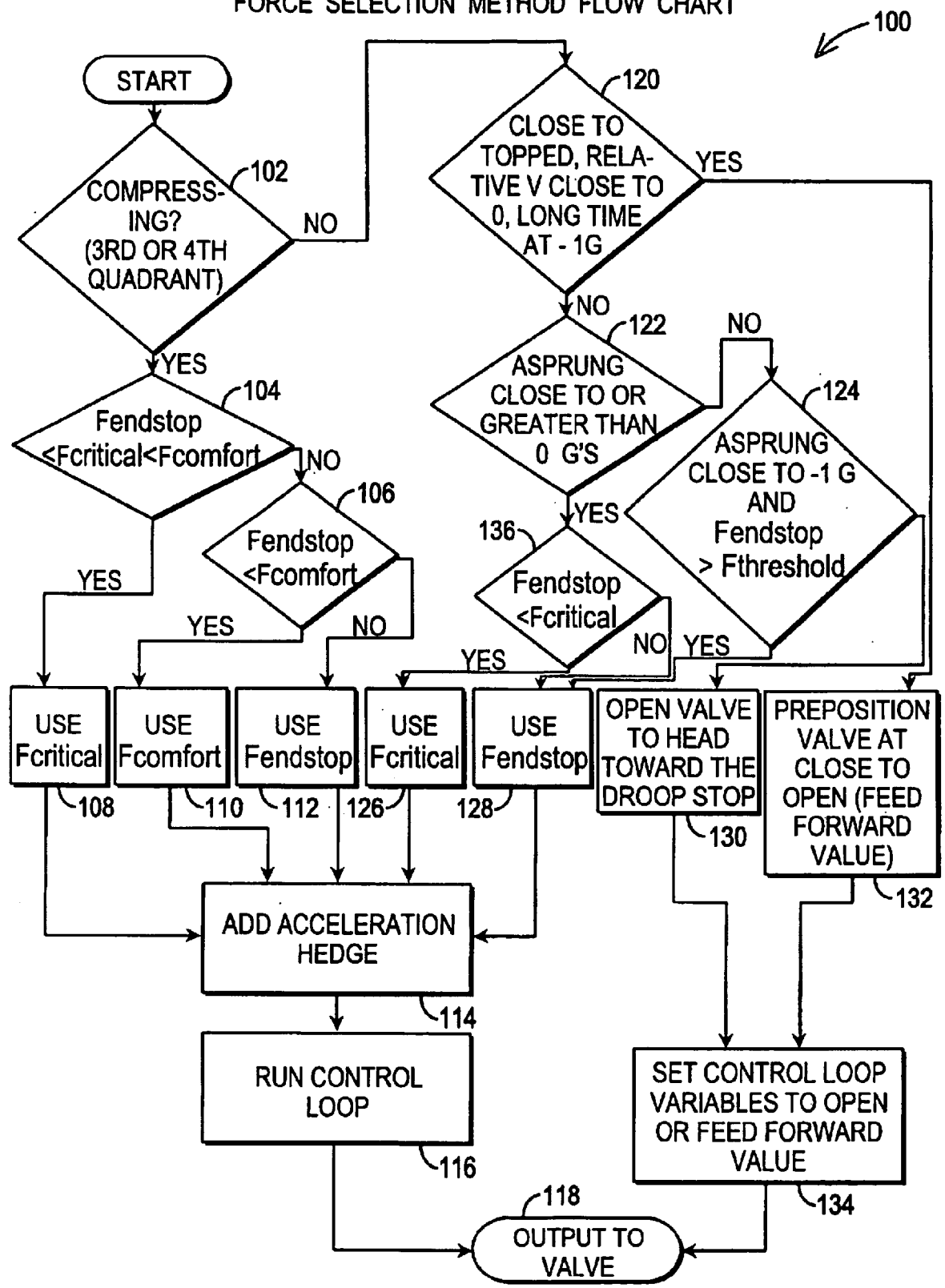
FIG. 5 FORCE SELECTION METHOD FLOW CHART

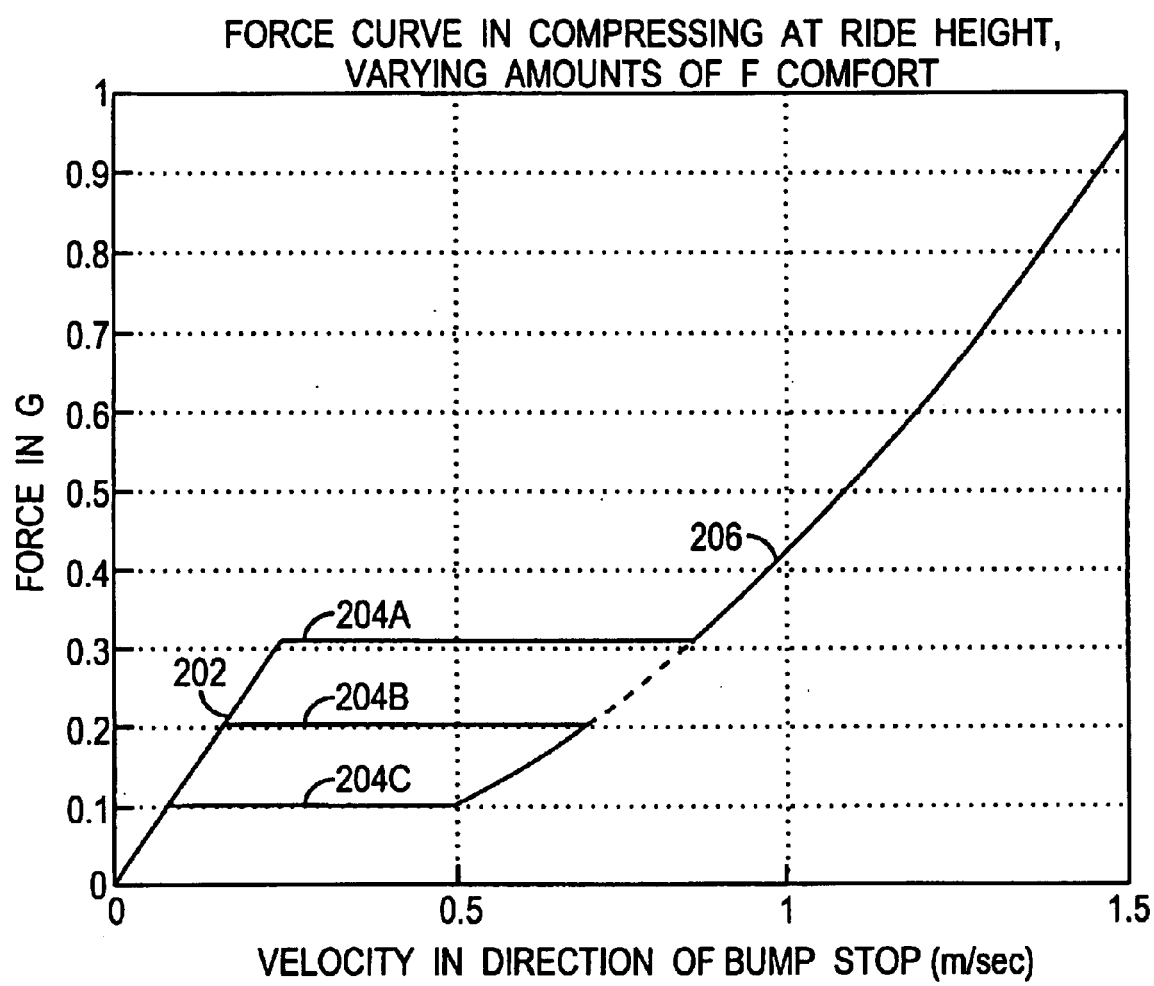

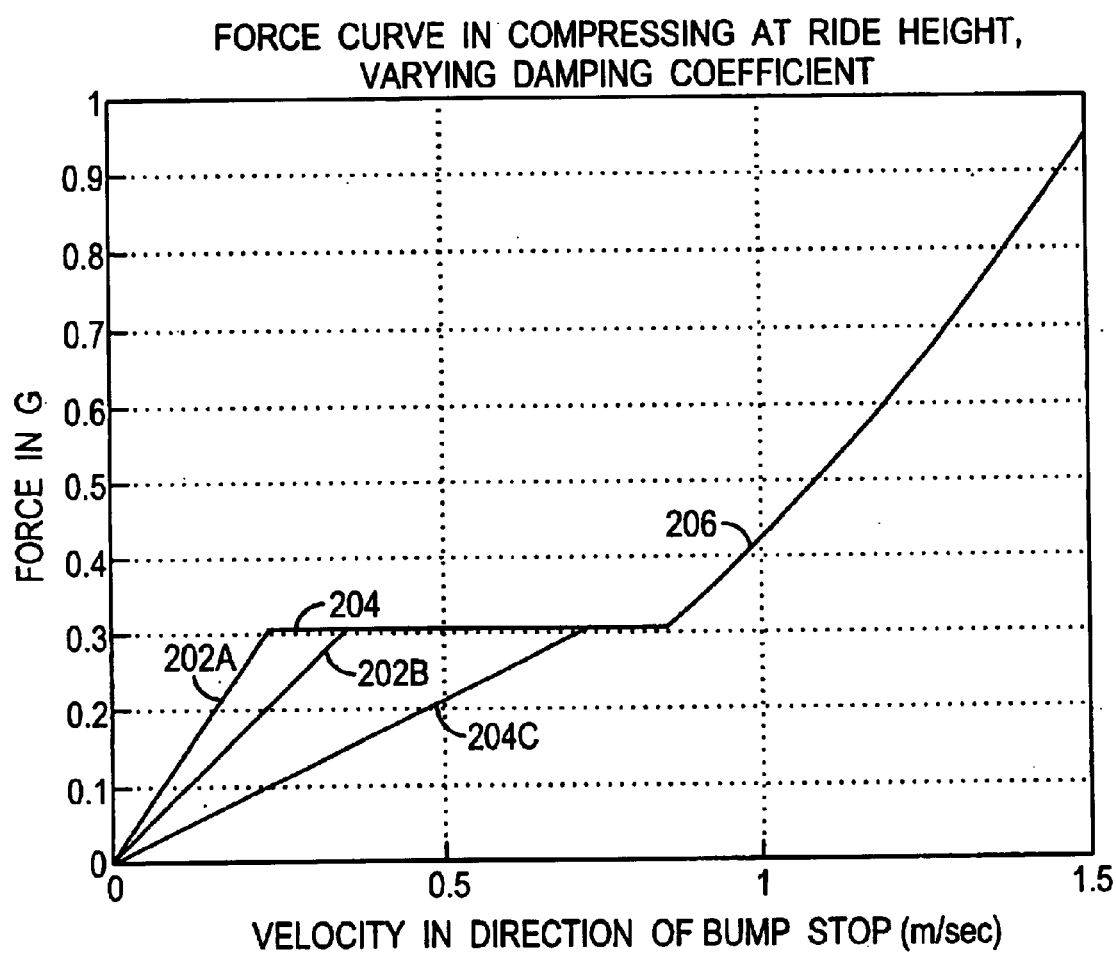

SEMI-ACTIVE SHOCK ABSORBER CONTROL SYSTEM

This application is a continuation application under 37 CFR § 1.53(b) of application Ser. No. 10/341,129 filed Jan. 13, 2003, now U.S. Pat. No. 6,732,033, which claims priority to U.S. Provisional Application Ser. No. 60/347,662, filed Jan. 11, 2002, both of which are incorporated herein by reference.

The U.S. Government has a paid-up license in this invention and the right in limited circumstances to require the patent owner to license others on reasonable terms as provided for by the terms of Contract Number USZA22-02-P-0024 awarded by the Department of Defense.

1. FIELD OF THE INVENTION

The present invention relates to a controller and control methodology for a semi-active shock absorber. More particularly, the present invention relates to a system and method of controlling the relative motion between two masses, using a suspension that includes a shock absorber or damper. The system and method can be applied to a number of types of systems such as the primary suspension on a vehicle, which isolates the mass of the chassis from the motion of the wheels as they run over rough terrain or a truck, or boat seat that is isolated from the movements of the cab or hull. The present invention has general applicability to any system that has a vibration isolation mechanism that isolates the sprung mass from movements of the unsprung mass such as engine mounts, machinery mounts or other typical applications for isolation mounts.

2. BACKGROUND OF THE INVENTION

Suspensions and isolation mounts generally fall into one of the following categories: passive, active or semi-active. Passive mounts usually include a passive spring and passive damper and can be tuned to provide very good isolation for a given set of conditions such as fixed masses and constant frequency disturbance into the unsprung mass. However if the mass changes due to increased payload, or the input frequency changes due to a change in speed over the ground, the isolation performance is degraded and often results in very large shock loads when the system hits the ends of travel, usually referred to as "topping" or "bottoming" the suspension.

Active suspensions are able to provide much better isolation over a wider range of conditions than a purely passive system. They can read a variety of sensors, then process the information to provide an optimal target force between the two masses at any time, given the power limits of the actuators and support systems. In addition, they are capable of adding energy to the system whereas passive and semi-active systems can only subtract energy. Active suspensions have not gained wide acceptance due to high cost and complexity as well as the demand for high power from the vehicles prime mover. In the case of off-road vehicles with long travel suspensions moving over rough terrain, the power draw of the suspension is prohibitive and reduces the maximum acceleration of the vehicle.

Semi-active suspensions are generally less costly and complex than fully active systems while retaining most of the performance advantages. They use the passive spring from conventional suspensions and add a controllable damper as well as the sensors and microprocessor required to allow the damper force to be controlled in real time. The damper can still only subtract energy from the system, however it can provide any level of damping that is demanded by the control method, rather than being governed by the fixed velocity/force laws that are characteristic of passive dampers.

There are a number of control methods that have been developed for semi-active suspensions, starting with "skyhook" method described by Karnopp, et al., "Vibration Control Using Semi-active Force Generator," ASME Paper No. 73DET-123, May 1974, and U.S. Pat. No. 3,807,678. This method attempts to make the damper exert a force which is proportional to the absolute velocity of the sprung mass, rather than the relative velocity between the two masses. Hence the term skyhook since the mass is treated as though it is referenced to the inertial coordinate system rather than the ground. While this method can yield very good isolation over bumps that are smaller than the amount of compression travel in the system, larger bumps cause the suspension to bottom out resulting in a large shock load being transmitted into the sprung mass.

Another method has been developed to deal with the bottoming and topping problem called the "end stop" method. In end stop mode, the microprocessor calculates the minimum force required to decelerate the sprung mass and prevent the suspension from bottoming. While this is effective in preventing the high shock loads from being transmitted into the sprung mass, it results in excessive suspension movement over smaller bumps. This can be very disconcerting to the operator because it prevents him from having a good "feel" for the behavior and handling of the vehicle.

There have also been attempts to combine several methods and assign relative weightings or develop rules that govern the use of alternate methods under certain circumstances. Most of these efforts have been aimed at isolation efficiency as the overall goal or metric of relative merit. However there are other factors that are important in suspension systems such as transient force distribution that can influence handling and vehicle control, as well as subjective factors such as operator comfort and confidence.

SUMMARY OF THE INVENTION

The present invention solves the shortcomings of the prior art with a set of rules that will result in a practical semi-active suspension control method.

In one aspect, the present invention includes a method for determining if a shock absorber system is compressing and for generating a target control signal for shock absorber system comprising two masses coupled together by a spring having a controllable valve to adjust the energy in said system. The method includes the step of determining if the spring/mass system is compressing in a z direction by determining the current velocity of the masses with respect to one another. The method also includes the step of generating an inertial endstop signal based on the relative velocity and the relative position of said masses, the inertial endstop signal is proportional to the minimum acceleration necessary for one of the masses to arrive at a position of minimum travel at approximately zero velocity. The method also includes the step of generating a damped signal based on a spring force constant, the critically damped signal is proportional to a critically damped trajectory of at least one of the masses, and generating a comfort signal defined as an upper force threshold for said critically damped signal. The method selects one of the signals as a target signal to control said valve and thereby adjust the energy in the spring/mass system.

In another aspect, the present invention includes a method for determining if a shock absorber system is expanding and for generating a target control signal for shock absorber system comprising two masses coupled together by a spring an having a controllable valve to adjust the energy in the system. The method includes the steps of determining if the spring mass system is expanding in a z direction by determining the current velocity of the masses with respect to one another; generating an inertial endstop signal based on the relative velocity of the masses, the inertial endstop signal is proportional to the minimum acceleration necessary for one of the masses to arrive at a position of maximum travel at approximately zero velocity; and generating a damped signal based on a spring force constant, the damped signal is proportional to a damped trajectory of at least one of the masses. The method also includes the steps of generating a first valve prepositioning signal proportional to the valve position that permits one of the masses to freefall away from the other mass; and generating a second valve prepositioning signal proportional to the valve position that permits one of the masses to controllably expand away from the other mass. The method selects one of these signals as a target signal to control said valve and thereby adjust the energy in the spring/mass system.

In still another aspect, the present invention provides a method for generating a target inertial and non-inertial energy control signal in a spring/mass shock absorber system comprising two masses coupled together by a spring having a controllable valve to adjust the energy in said system. The method includes the steps of: generating an endstop signal based on the relative velocity and relative position of the two masses, the inertial endstop signal is proportional to the minimum acceleration necessary for one of the masses to arrive at a position of maximum or minimum travel at approximately zero velocity. The method modifies the endstop signal with a signal indicative of the absolute velocity and the absolute displacement of the masses with respect to one another. The method also determines if the endstop signal should be designated as a target control signal for the controllable valve based on the relative velocity of said masses.

In yet other aspects, the present invention provides a method for generating a target multidimensional damped energy control signal in a spring/mass shock absorber system comprising two masses coupled together by a spring having a controllable valve to adjust the energy in said system. The method includes the steps of: generating a damped signal based on a spring force constant, the damped signal is proportional to a damped trajectory of at least one of the masses in the z direction; defining a critically damped coefficient; and multiplying the damped signal by the critically damped coefficient. The method further includes the steps of calculating measuring the acceleration of at least one of said two masses in the x and/or y direction, and modifying the critically damped coefficient based on the measured acceleration of at least one of said two masses in the x and/or y direction. The method also determines if the damped signal should be designated as a target control signal for the controllable valve.

Another aspect of the present invention provides a method for generating a target direct valve control signal in a spring/mass shock absorber system comprising two masses coupled together by a spring having a controllable valve to adjust the energy in the system. The method includes the steps of generating a valve prepositioning signal based on the relative position and relative velocity of the masses, the valve prepositioning signal is proportional to a predefined amount of prepositioning for the valve so that the energy of the spring assumes a predefined quantity; aind determining if the valve propositioning signal should be designated as a target control signal for the controllable valve based on the relative velocity of said masses.

The present invention also provides a method for modifying a valve control signal with an acceleration hedge control signal in a spring/mass shock absorber system comprising two masses coupled together by a spring having a controllable valve to adjust the energy in said system. The method includes the steps of generating a plurality of valve control signals based on the relative velocity of the masses and generating an acceleration hedge signal proportional to the addition of the acceleration or force of a first one the masses to that of the second one of the masses to drive the average acceleration or force of the second mass to approximately equal the actual acceleration or force of the first mass. The acceleration hedge signal is added to a selected one of said valve control signals.

It will be appreciated by those skilled in the art that although the following Detailed Description will proceed with reference being made to preferred embodiments, the present invention is not intended to be limited to these embodiments. It should be understood from the outset that the present invention shall make use of the terms "methods" or "modular processors", and the such terms shall be construed broadly as encompassing one or more program processes, data structures, source code, program code, etc., and/or other stored data on one or more conventional general purpose and/or proprietary processors, that may include memory storage means (e.g. RAM, ROM) and storage devices (e.g. computer-readable memory, disk array, direct access storage). Alternatively, or additionally, such methods or modular processors may be implemented using custom and/or off-the-shelf circuit components arranged in a manner well-understood in the art to achieve the functionality stated herein.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 5 is an exemplary flow chart of the force selection processor utilized by the spring/mass system controller of the present invention;

FIG. 10A is an exemplary spring/mass system response curve in the force-velocity space (F-V) when the system is controlled in a manner according to the principles set forth herein; and FIG. 10B is another exemplary spring/mass system response curve in the force-velocity space (F-V) when the system is controlled in a manner according to the principles set forth herein.

DETAILED DESCRIPTION OF EXEMPLARY EMBODIMENTS

Figure 1:
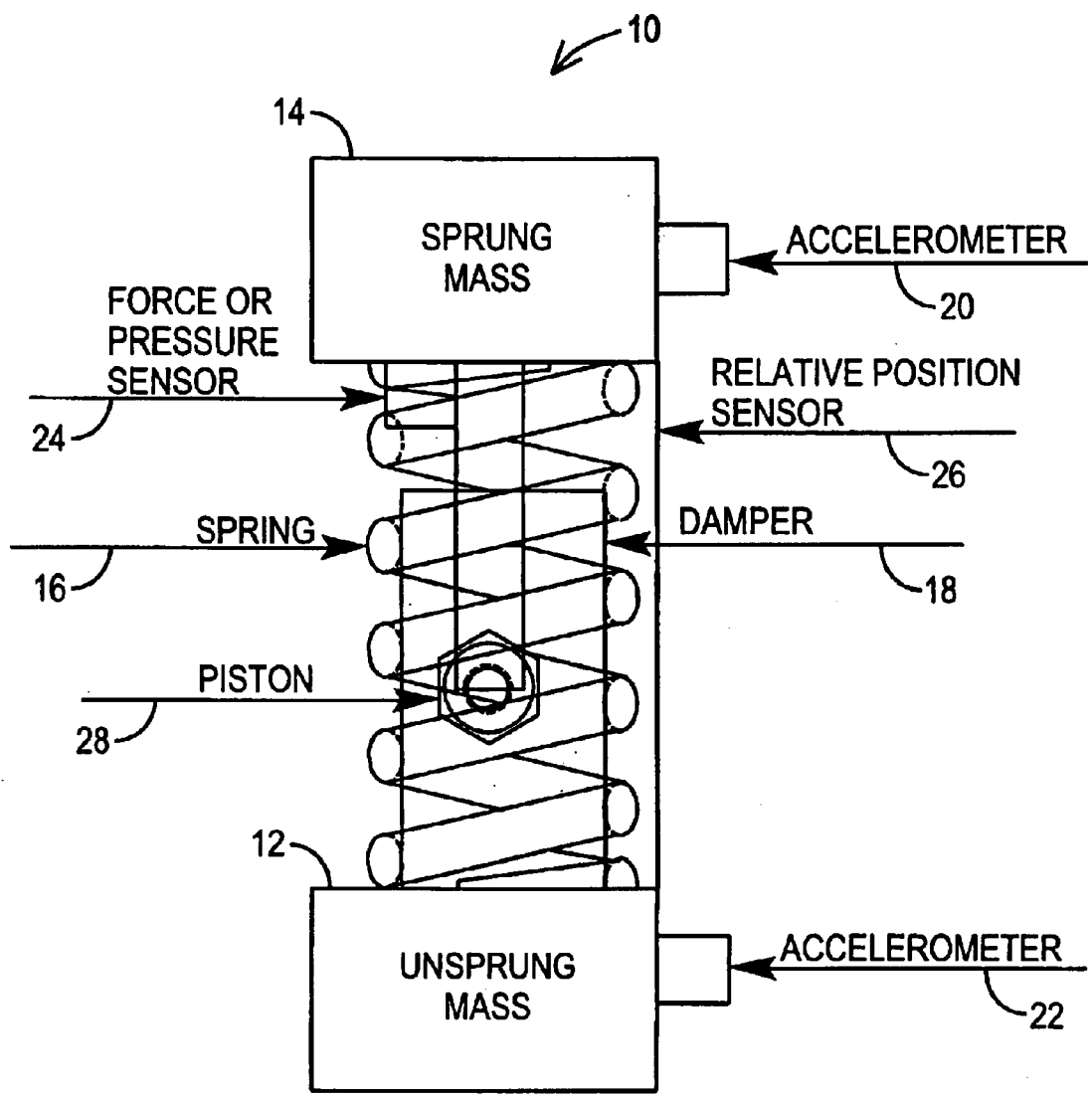
FIG. 1 is a representation of a mass/spring system, where relative motion of the two masses is controlled by a spring and damper.

Before describing the present invention in detail, the following definitions shall be used throughout the Detailed Description.

Definitions

Sprung Mass (SM)—A sprung mass, in the case of a car it would be the car chassis, in the case of a truck seat, it would be the seat and passenger.

Unsprung Mass (USM)— An unsprung mass, in the case of a car it would be the wheel; in the case of a truck seat it would be the truck.

Relative Position (Xrel)— means the position of the sprung mass (SM) and the unsprung mass (USM) relative to one another.

Relative Velocity (Vrel)— means the velocity of the SM and USM relative to one another.

Bump Stop—Position of physical constraint that limits the minimum possible relative position of the masses.

Droop Stop—Position of physical constraint that limits the maximum possible relative position of the masses.

Endstop—means either the droop stop or bump stop or both.

Xend—is a constant for a given system and represent the endstop position.

K—spring force constant.

Fcomfort—an upper force threshold for the critically damped force. Fcomfort is a user-defined or preset force variable, and is generally provided to provide a smoother system response than Fcritical.

Fthresh—a force that slows the USM when the system is in freefall so that the USM goes to the droop stop position at zero velocity. Fthresh is a user-definable or preset force where an increase in Fthresh brings the USM to the droop stop more quickly. 0 Gs is an object not being accelerated at all in the Z direction, perpendicular to the surface of the earth.

−1 Gs is an object in free-fall in the Z direction, perpendicular to the surface of the earth.

Overview

As an overview, the present invention provides a method for defining various operating zones within the characteristic velocity/position control space and a means of smoothly transitioning between a number of methods as the suspension moves between zones. In addition, the invention can mimic an inertially controlled shock absorber valve. This enables it to discern whether the sprung or unsprung mass is moving and select appropriate damping forces. In other words, it can tell if the vehicle chassis is moving up, or the suspension and wheel is moving down. If the chassis is moving, then the suspension will try to damp out the movement. When the suspension is moving down, and the chassis is experiencing −1 gs, it is usually because the vehicle is airborne or crossing a large hole and the suspension will allow the wheel to droop in order to have maximum travel available for the landing or the next bump. On the other hand, if the chassis is still seeing 0 g, the obstacle is a pothole, then the system would not let wheel drop nearly as fast in this case.

The invention minimizes the number of sensor readings and subsequent calculations required to identify the target control parameter. This will help to decrease the control loop execution time and keep the control bandwidth high, even with inexpensive microprocessors.

One goal of this invention is to produce a practical suspension control system with good performance in all aspects of vehicle or system dynamics, not just vibration isolation. It will accomplish this by providing a simple intuitive set of rules for adjusting the transition threshold between operating zones that is easy to adjust for different applications or operator preferences. The end result will be excellent isolation when large inputs to the unsprung mass are experienced without sacrificing stability and operator feel during normal operation.

FIG. 1 depicts a typical mass/spring system 10. The system 10 includes an unsprung mass USM 12 and a sprung mass SM 14 coupled together via a spring 16. A damper 18 is provided to control the energy of the system in a manner according to the present invention. The damper 18 is generalized in the description herein as a valve, as such valves are well understood in the art. The valve can be, for example, a mechanical, electromechanical, controllably viscous fluid (electrorheological or magnetorheological fluid type), or any other controllable valve as is known in the art.

The system also includes a plurality of sensors to generate some of the variables used by the spring/mass controller, described below. In the exemplary embodiment, accelerometers 20 and 22 are used to monitor the acceleration of each of the SM and USM, respectively. Each accelerometer outputs a signal proportional to the acceleration of the masses. Also, a relative position sensor 26 is provided to generate a signal proportional to the relative position of the masses with respect to one another in the z direction. Additionally, a force or pressure sensor 24 may be included that directly measures the combined force of the shock absorber and spring (although not a requirement). Other sensors may be provided, for example, accelerometers in the x and y directions, or pressures sensors within the shock absorber. The particulars of the sensors are not important for an understanding of the present invention. Rather, any type of sensor known in the art may be employed to generate signals proportional to acceleration and position.

Controller

Figure 6:
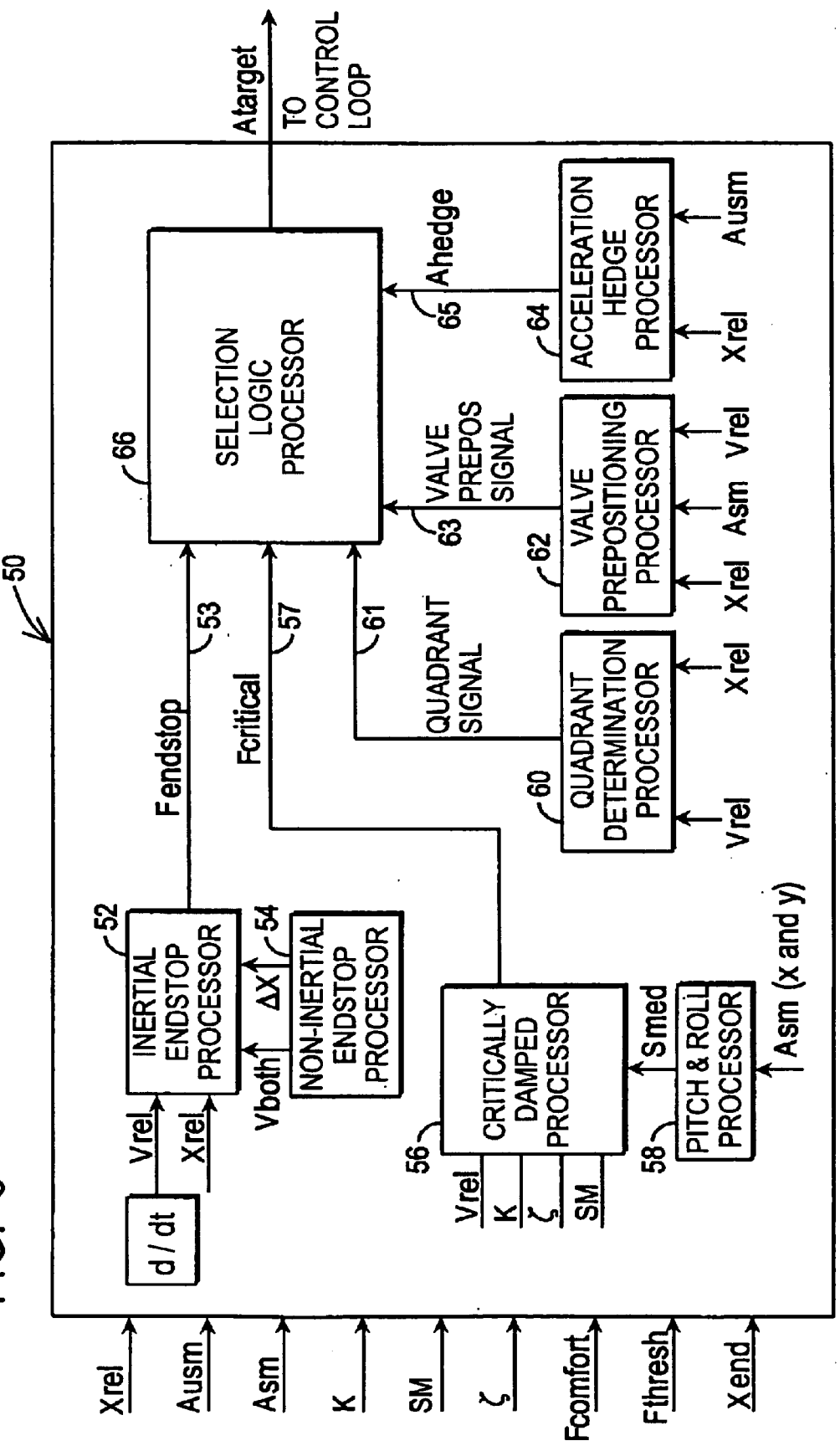
FIG. 6 is an exemplary block diagram of the spring/mass system controller of the present invention.

FIG. 6 depicts a block diagram of the spring force (or acceleration) controller 50 of the present invention. The controller 50 includes a plurality of sensor and user-defined inputs, and generates a target acceleration or force that is utilized to set the damper to adjust the energy of the spring/mass system. The controller 50 includes a plurality of modular processors 52, 54, 56, 5S, 60, 62 and 64 to generate a plurality of control signals that are utilized by the valve to control the spring/mass system 10. For example, the control signals may include force or acceleration or direct valve control signals. The controller 50 also includes selection logic processor 66 that includes the set of predefined miles to select a target acceleration or force based on the relative position and relative velocity of the spring/mass system 10. The output of the selection logic processor 66 is a target control signal proportional to a desired energy in the spring/mass system, as may be represented by acceleration, force or velocity. The following detailed description shall assume that the control signal is a target acceleration signal, Atarget, but it should be understood this signal may be generalized as a target control signal. Atarget is signal that is used to control the valve to thereby adjust the energy of the system.

The controller of this exemplary embodiment is directed at generating a target force or acceleration signal based on a set of predefined rules for controlling the energy in the system defined by the masses and the spring. Of course, the controller may be adapted to control the unsprung mass or sprung mass independently. The following detailed description of the controller 50 will discuss the generation of various force and acceleration signals. Since the masses in the system are known, these quantities may be used interchangeably. Likewise, it may be desirable to produce velocity signals instead of force or acceleration signals, and such a modification is equally contemplated herein by integrating acceleration.

If the modular processors are embodied as executable code running on a processor, then the controller 50 of the present invention may also include analog to digital circuitry to convert the analog input signals to a digital value. Such A/D converters may be selected to have a bit depth and/or sampling frequency to generate digital signals of a desired resolution. Alternatively, those skilled in the art will recognize numerous circuit component implementations for the modular processors to achieve the desired output signals, based on the mathematical formulations described herein. It should be further noted that the controller 50 may include processors to derivate or integrate one or more of the input signals to achieve a desired function. For example, as shown in FIG. 6, a d/dt processor may be included to derive Vrel from Xrel. Each of the components of the exemplary controller 50 is described below.

Quadrant Determination Processor 60

Figure 2A:
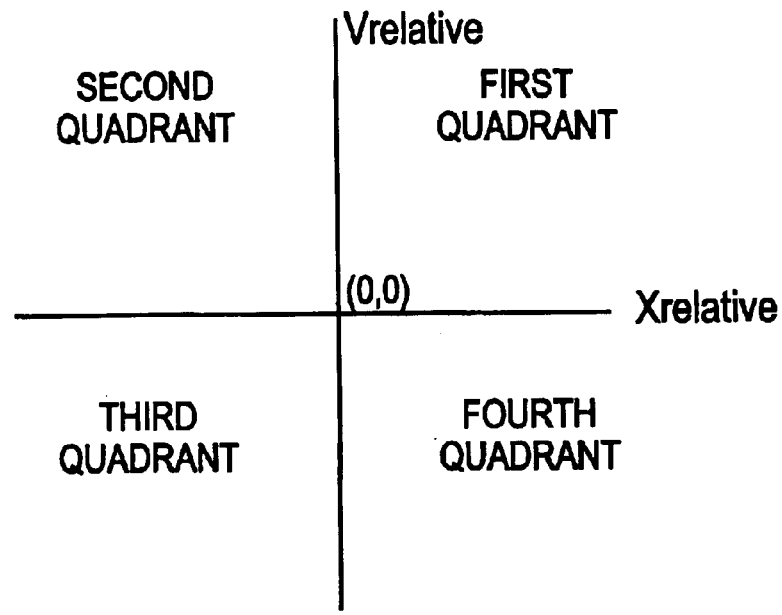
FIGS. 2A and 2B are space diagrams of the relative position and velocity of the two masses of the mass/spring system.
Figure 2B:
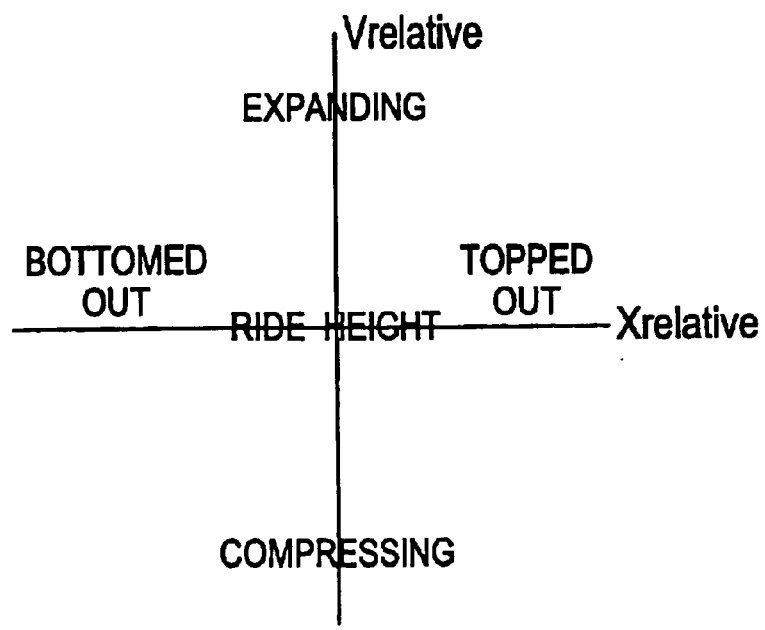

One of the modular processors of the controller 50 includes a quadrant determination processor 60. This processor determines the relative position and velocity of the two masses, and determines the quadrant of operation for the sprung mass. Referring now to FIGS. 2A and 2B the operational areas of the controller 50 can be roughly mapped out on a 2 dimensional coordinate system in which the x-axis is the relative displacement between the sprung and unsprung masses and the y-axis is the relative velocity of the sprung and unsprung masses. The 0,0 point is designated as ride height with no movement of the sprung or unsprung masses.

The third quadrant is compression where velocity is negative and the position is heading towards a "bottomed out" condition. The second quadrant is also where the spring is under compression, but returning to ride height. The fourth quadrant is similar to the third quadrant, except the spring is expanding and the position is heading toward a "topped out" condition. The first quadrant is similar to the fourth quadrant but returning to ride height. The quadrant determination process uses Xrel and Vrel as inputs, and generates a quadrant signal 61 indicative of the quadrant the system is operating in.

Inertial Endstop Processor 52 and Non-Inertial Endstop Processor 54

Figure 3:
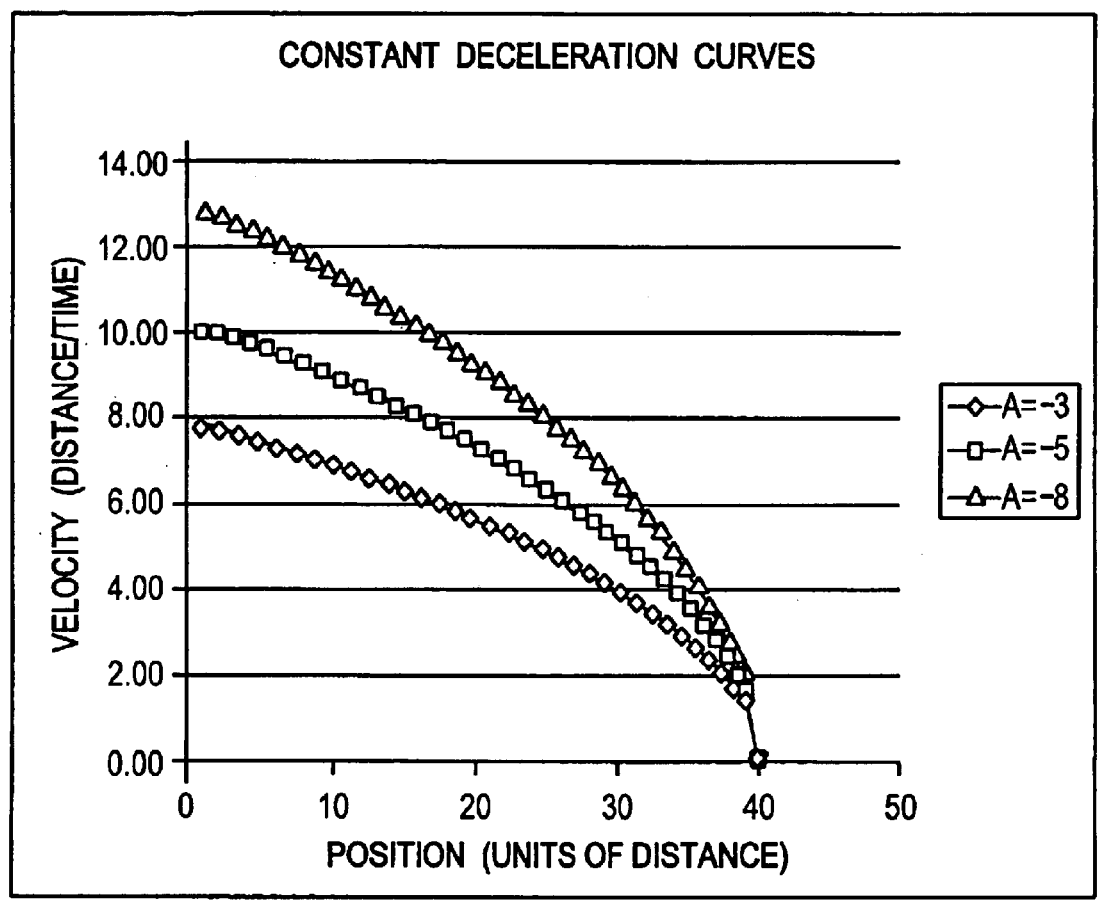
FIG. 3 is a collection of exemplary constant deceleration trajectory curves generated by the system controller of the present invention.

Inertial endstop processor 52 uses Xrel, Vrel and Xend to produce a constant acceleration (or force) signal, Fendstop 53, that is proportional to the minimum acceleration necessary to arrive at the endstop at zero velocity (For example, along a deceleration trajectory depicted in FIG. 3). The force profile that produces the minimum peak force is a constant force. Given a mass of M, an initial velocity of vo, and an initial position of xo, the kinetic energy is:

$$E = \tfrac{1}{2}M*V^2$$

To reduce that energy evenly, work must be performed over a distance equal to the distance to the endstop via a constant force.

$$(X-X_{end})*F = \tfrac{1}{2}M*V^2$$

Solving for F produces:

$$F = \frac{\tfrac{1}{2}M*V^2}{(X - X_{end})}$$

Dividing both sides by the mass produces the acceleration on the left hand side.

$$A = \frac{\tfrac{1}{2}V^2}{(X - X_{end})}$$

This equation states a couple of facts.

To determine the constant acceleration necessary to just touch the endstop, the inputs are current velocity, current position and endstop position (bump stop and droop stop), no system parameters such as the spring constant or mass are necessary. Because velocity and position are always changing, this calculation may be performed at a speed for a desired resolution, e.g. every control cycle.

FIG. 3 depicts exemplary constant deceleration curves which may be generated by the inertial endstop calculation. The velocity as a function of position for a constant acceleration is a square root function. Since vo and xo are the current location and Xend is the endstop location, none of the values depend on system parameters that are changeable relative to the system. In the exemplary embodiment, therefore, the inertial endstop calculation can be implemented with a table look-up or other hard coded method to optimize for code space or execution time.

The inertial endstop processor calculation operates on the assumption that the unsprung mass has come to rest via an impulse force, and thus, there is no absolute velocity of the pair moving together. Neglecting this absolute velocity and the absolute displacement that comes with it may cause the inertial endstop method to be unprepared for some hard landings in which the force imparted in the vertical direction upon the unsprung mass is not an impulse.

Two examples would be a boat landing on a wave or a vehicle landing on a slope that is falling away. In those cases, a pure inertial endstop method would recognize the need to apply a force higher than the fractional critically damped force much later than is desirable and generate a large peak force to make up for the earlier underestimate.

To improve upon this, the exemplary controller 50 may also include a non-inertial endstop processor 54. Essentially, the non-inertial endstop processor 54 anticipates these larger bumps by keeping track of the absolute velocity of the mass pair. Thus when heading towards bottomed out, even when close to topped out, a non-inertial endstop calculation can determine if an endstop method needs to be applied even sooner.

This method starts with a base assumption that the acceleration of the unsprung mass will be constant at the currently measured or estimated value until it reaches zero velocity. The inputs to this process are Vrel and the acceleration of the unsprung mass Ausm. In that case, the distant traveled by the mass pair will be:

$$\Delta X = \frac{\frac{1}{2} * V_{both}^2}{A_{unsprung}}$$

The preceding equation being a result of similar derivation of the above inertial endstop process 52.

Then the endstop method takes as inputs a modified initial velocity that includes Vboth and a modified displacement over which the force must be applied.

The initial velocity is:

$$V_o = V_{both} + V_{relative}$$

The displacement over which the force must be applied is:

$$(X - X_{end}) + \Delta X$$

Where $\Delta X$ is calculated as above and the $(X - X_{end})$ is the calculation of the distance of the relative displacement from the end stop.

The non-inertial endstop process 54 produces Vboth and delta X, and inputs these values into the process for the inertial endstop 52. Thus a modified and larger delta X and a modified and larger V can be plugged into the inertial endstop force processor 52 to determine the necessary force in a non-inertial reference. That is, when the unsprung does not come to rest suddenly but more slowly over time. This process may be included to help the inertial endstop processor recognize that the large speed built up during the free-fall must be dissipated sooner but that it has the entire modified delta X over which to apply the force. This modifies the Fendstop signal 53 to include these quantities. Critically Damped Processor 56 and Pitch and Roll Processor 58

The controller 50 may also include a processor 56 that generates a critical force (or acceleration) Fcritical 57 to return to ride height (0,0) along a path that is some predetermined fraction, of critically damped. The inputs to the critically damped processor 56 include K (spring force constant), the mass of the sprung mass (MS), the relative velocity of the masses Vrel, and a desired critically damped coefficient $\xi$.

To calculate that force, one starts with the equation of motion of system comprising a spring and a linear damper:

$$F = -K*X - B*V$$

Dividing both sides by the mass:

$$A = -\frac{K}{M}*X - \frac{B}{M}*V$$

Since for a mass-spring system the square root of K/M equals $\omega_o$, which is the resonant frequency, and (B/M) equals the damping coefficient, gamma, which equals $2*\xi*\omega$:

$$A = -\omega_o^2*X - 2*\xi*\omega_o*V$$

Thus the critical damping force (or acceleration) can be calculated by measuring the relative displacement from ride height and the relative velocity with a couple of configuration parameters to determine the resonant frequency and the fraction of critical damping of the system, $\xi$.

Adjusting the $\xi$ of the system allows the damping to be adjusted relative to critically damped. Thus, $\xi$ is a user defined input that may be adjusted as desired. A $\xi$ of one is equivalent to critically damped and a $\xi$ of ½ results in a performance that is equivalent to being at ½ of critically damped.

Figure 4A:
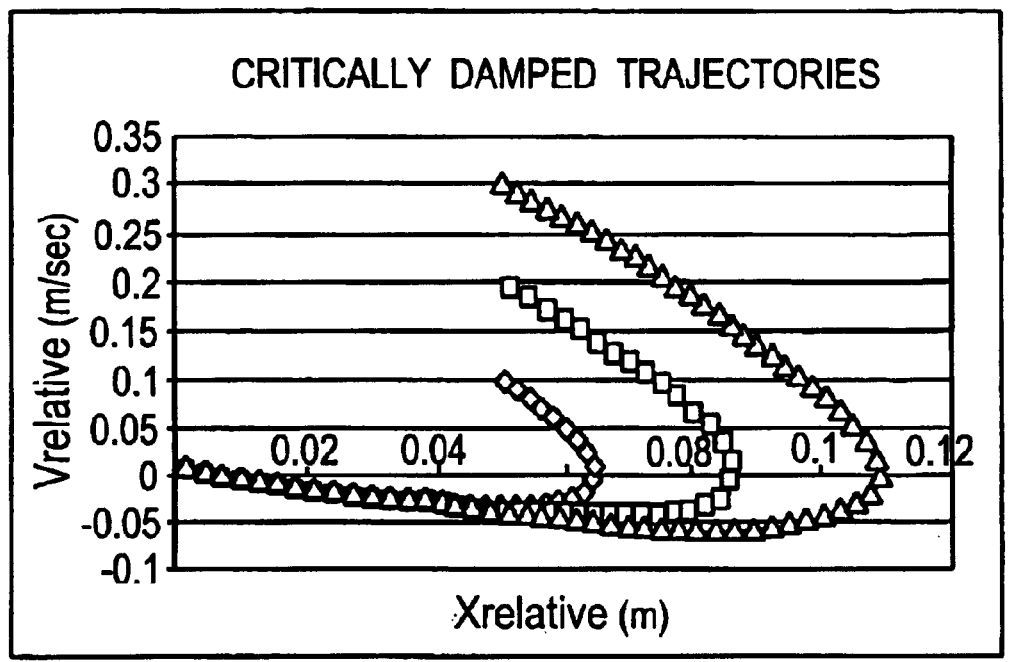
FIGS. 4A and 4B are a collection of critically damped and underdamped trajectories, respectively, as representing a force generated by the system controller of the present invention.

FIG. 4A depicts three exemplary trajectories that result when $\xi$ is one, i.e., the system is critically damped. The x-axis represents ride height, and in this case the sprung mass returns to ride height with no overshoot. The result of this system is that the suspension may feel harsh in terms of ride quality and may be too slow to return to ride height.

Figure 4B:
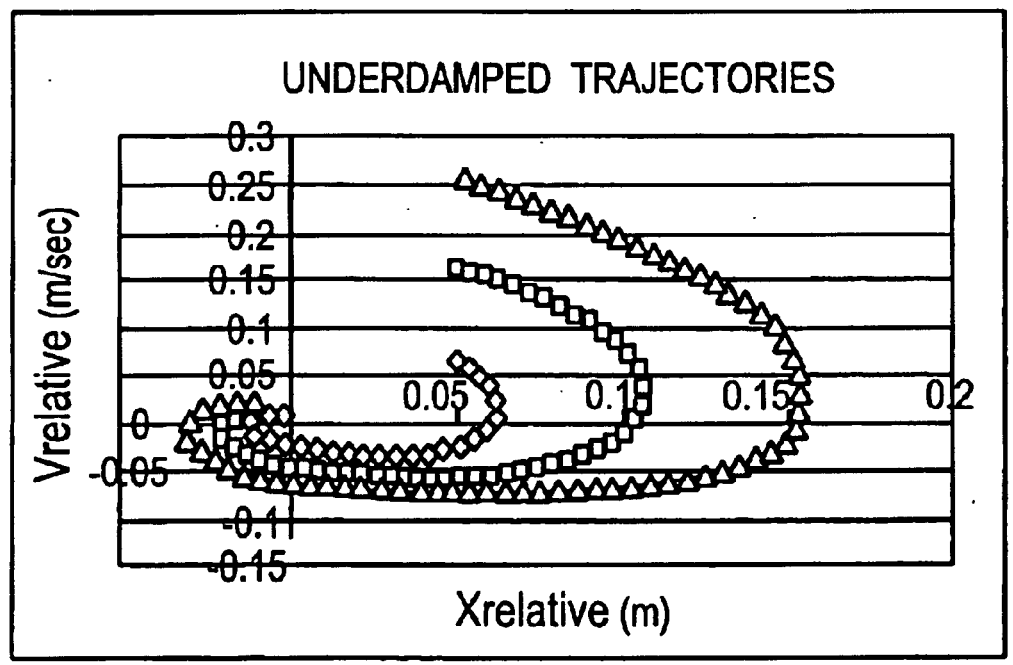

By reducing the damping to some fraction of critically damped, there can be a reasonable amount of overshoot, at most one or two noticeable cycles, and a considerable reduction in the harshness sensed by the occupant. The amount of critical damping can be a preset parameter or a user-selectable input. FIG. 4B depicts three exemplary trajectories that result when $\xi$ is less than 1, i.e., the system is underdamped.

In vehicles in which the shock absorber plays a roll in determining pitch and roll movement during braking, accelerating or cornering, an additional modification to the calculation of the target force can be made. The pitch and roll processor 58 may be provided to generate this modification to $\xi$. In the exemplary embodiment, the input to the pitch and roll process 58 is the acceleration of the sprung mass (Asm) along the x (pitch) and y (roll) axes. Of course, the accelerometer associated with the sprung mass may be adapted to also detect acceleration in the x and y directions, or alternatively additional sensors may be included in the system 10 of FIG. 1 to generate these additional acceleration signals in the x and y dimension. By sensing both the X and Y axis acceleration, the system can determine when braking, acceleration or cornering is occurring. Once one of these conditions is detected and the magnitude of the condition computed, the pitch and roll processor 58 modifies the fractional amount of damping in all four corners of the vehicle by increasing the damping to approach critical damping. This fractional amount of critical damping can be increased to nearly one as the magnitude of the condition increases to some preset or configurable level. The result of the pitch and roll process 58 is a modified damping coefficient, $\xi$ mod.

The resulting affect is that during straight driving the damping is less and thus less road vibration is transmitted through the suspension to the vehicle. But if either lateral or longitudinal acceleration is occurring, then the dampers "stiffen up" and rather than wallowing, vehicle reaches the final ride "attitude" quickly without overshoot.

Valve Prepositioning Processor 62

A long period of −1 g is an indication that a hard landing is about to occur. Given an Asm of −1 g and the unsprung mass at or approximately at the droop stop, the exemplary embodiment may include a valve prepositioning processor 62 that determines if the valve should be prepositioned for the hard landing. This test may include the use of velocity heading back to the bump stop depending on the sensitivity needed to insure that the valve is opened at the appropriate moment, although this is not required for valve prepositioning.

The valve prepositioning process 62 uses as inputs Xrel, Asm, Vrel and Xend, and generates a valve prepositioning signal 63 proportional to the desired amount of prepositioning for the valve. In one exemplary embodiment, this process may produce a signal 63 that opens the valve all the way given that a large relative velocity requires a more wide open valve. This can be further refined with, for example, feedforward tables mapping the absolute velocity of the system into a guessed valve position, or refined by artificial intelligence in which the process learns the behavior of the system over time and the resultant valve position that occurred in landing with a similar initial velocity.

This hard landing anticipation by prepositioning the valve may be utilized to help reduce the speed/bandwidth requirements of the valve used in controlling the damping by reducing the full scale slew rate necessary.

Acceleration Hedge Process 64

Because the sprung and the unsprung masses must remain together within the bounds of the two endstops, the acceleration applied to each of these two masses on average must be equal. This matching of the average acceleration becomes more important as the relative displacement approaches one of the end stops.

Thus the acceleration hedge process 64 can be adapted to add in the acceleration of the unsprung mass to that of the target acceleration of the sprung mass to drive the average of the sprung mass acceleration to equal that of the unsprung's actual acceleration. Adding in the acceleration of the unsprung mass directly to the target would render suspension useless as a form of isolation, because it is that very acceleration being added into the target that is to be isolated from the sprung mass.

To get around this seeming conflict, the acceleration of the unsprung mass is attenuated by two methods prior to adding it into that of the sprung mass's target.

First the acceleration of the unsprung mass is passed through a low pass filter set to a cutoff frequency that balances response time with isolation. This cutoff frequency can be a tuned parameter for each application. Those skilled in the art will recognize that such a filter can be readily constructed using well-known components and/or algorithms. As a general rule of thumb, the greater the cutoff frequency means less suspension movement and less isolation. Lower cutoff frequencies decrease the effectiveness of the hedge acceleration Ahedge. Thus, when implementing the acceleration hedge processor, these tradeoffs may be considered.

Second, this filtered value is added to the target acceleration of the sprung mass in a weighted fashion, i.e., fractionally as the relative displacements of the two masses approaches an endstop. For example: to mitigate this match of the average accelerations as the relative displacements approach the bump stop, a positive acceleration from the unsprung mass is added completely into the target. But if the relative displacement is near the droop strop, then none of a positive acceleration measured at the sprung mass is added into the target acceleration for the sprung mass. Similarly, this weighting function can be applied against negative accelerations when heading in the direction of the droop stop.

Selection Logic

Still with reference to FIG. 6, and using the signals 53, 57, 61, 63 and 65 generated by the above-described process, the present invention also includes a selection logic processor 66 to decide, based on a set of rules, which of the force signals 53, 57, 61, or 65 is to be used for a target acceleration Atarget. Atarget, in turn, may be used as a control signal for valve positioning in a closed-loop feedback system, as will be described below with reference to FIGS. 7, 8, and 9.

Referring now to FIG. 5, depicted is an exemplary flowchart 100 representing the rules executed by the selection logic processor 66 of the controller of the present invention. The process starts by determining whether the mass/spring system is compressing (third or fourth quadrant) 102.

As a general matter, when system operation is in the third or fourth quadrant, the selection logic may be summarized as follows. If the force necessary to return to ride height along a fraction of a critically damped path is less than Fcomfort and applying that force will not result in hitting the endstop then apply that force. Else if that critically damped force is greater than Fcomfort and applying F comfort will not result in hitting the endstop then apply Fcomfort. Else apply the minimum constant force necessary to prevent hitting the endstop.

FIG. 5 depicts this general flow by first determining if the damped force (Fcritical) is less than the comfort force Fcomfort and greater than the endstop force Fendstop 104. If yes, then Fcritical is used 108, and may be modified by the acceleration hedge signal Ahedge 114. This is the target acceleration Atarget for these conditions, and Atarget is input into a feedback control loop 116 to adjust the valve 118 and thereby adjust the energy in the system.

If Fcritical is greater than Fcomfort (104), then the process determines if Fendstop is less than Fcomfort 106. If yes, the selection logic applies Fcomfort 110, as may be modified by Ahedge 114. If not, the selection logic applies Fendstop 112, and the process continues as described above.

As described above, the acceleration hedge may be added to the target acceleration, thereby creating a new target acceleration.

Mathematically, this could be expressed as follows:

If (Aunsprung>0)

Then Atarget(new)=Atarget(old)+Wbump(X)*Filter (Aunsprung)

Else

Then Atarget Atarget(old)+Wdroop(X)*Filter (Aunsprung)

Where:

Atarget(old) is the target acceleration calculated with any of the previously described methods.

Aunsprung is the measured acceleration at the unsprung mass.

Filter( ) is a function that provides a selected low pass filtering of the input value.

X is the relative displacement.

Wbump and Wdroop are weighting functions that are no lower than zero and increase to 1 as X approaches the bump stop or droop stop for the respective functions. The shape of these weighting functions can be selected for a particular application or generalized for a wide variety of applications and or operating environments. For example, linear and/or logarithmic, and/or exponential weighting may be applied, starting a zero at one endstop and rising to one at the other endstop.

If the mass/spring system is not compressing 102 (i.e., in the first or second quadrants), the selection process can be summarized as follows. If the absolute acceleration of the sprung mass is close to or greater than 0 G's, then apply the force necessary to return to ride height along a fraction of critically damped path. Else if acceleration of the sprung mass is close to −1 G's and if the velocity and position are such that the constant force required to prevent endstop reaches or exceeds a threshold, then apply the endstop force, else (relative to the endstop force calculation) assume that the sprung mass is airborne and the unsprung is now heading in an unrestrained fashion to the topped out endstop. Allow as much droop travel as possible to prepare for the eventual "landing" with as much bump travel as possible.

This process is depicted in FIG. 5 by first determining if the sprung mass is close to a topped out condition, Vrel is approximately 0, and the system has spent some predetermined time at −1 G (freefalling) 120. If yes, the logic applies the valve propositioning signal to bias the valve so that the system anticipates an impulse acceleration that will occur to the system 132. In this case, the control loop is set to feed forward the force variables 134, which is output to the valve 118. If the results of step 120 are negative, the selection logic determines if Asprung is approximately or greater than 0 G's 122. If yes, the logic determines if the endstop force is less than the damped force 136, and if so, the logic applies the damped force 126. If the result of step 122 is negative, the logic determines if Asm is approximately −1 G and Fendstop>Fthreshold 124. If yes, the logic applies Fendstop 128, and the process continues. If not the logic applies the valve propositioning signal to bias the valve at approximately the open position to allow the mass to move apart as fast as the system will allow (i.e., freely move apart within the constraints of the system) 130, and the process continues at 134.

It should be understood that the use of the term "approximately" herein is intended to be construed broadly, and may mean, for example, a value within engineering tolerances of the components of the system or system measurement, or a value within a selected tolerance that generates an acceptable level of error.

Force-Velocity Curves

FIG. 10A depicts an exemplary spring/mass system response curve in the force-velocity space (F-V) when the system is controlled in a manner according to the principles set forth herein. The y-axis is arbitrary units of force (N), and the x-axis is arbitrary units of velocity (m/sec). The system response is roughly symmetrical about the x-axis, since above the x-axis the spring/mass system is compressing, and below the x-axis the system is expanding.

This curve depicts the zones of operation of the system. A first zone 202 is the application of Fcritical as the target acceleration. As the velocity increases, a linearized force, Fcomfort is applied 204. Depicted in this figure are three exemplary values for Fcomfort 204A, 204B and 204C. As a general matter, Fcomfort is a linearized function that flattens out the application of Fcritical. The lower the value of Fcomfort, the lower the force applied as velocity of the masses increases. At greater velocities, Fendstop is applied 206. The controller of the present invention permits each of the operating zones to have independent slopes and application positions, based on the variables and user-defined (or preset) inputs that control those forces. Thus, conceptualizing FIG. 10A into 3 dimensions (where position is coming in and out of the page), the present invention permits each zone to operate over the entire 3 dimensional space, thereby permitting a desired operating zone to be selected over a wide variety of operating conditions.

FIG. 10B depicts another exemplary spring/mass system response curve in the force-velocity space (F-V) when the system is controlled in a manner according to the principles set forth herein. The y-axis is arbitrary units of force (N), and the x-axis is arbitrary units of velocity (m/sec). The system response is roughly symmetrical about the x-axis, since above the x-axis the spring/mass system is compressing, and below the x-axis the system is expanding.

A first zone 202 is the application of Fcritical as the target acceleration. As the velocity increases, a linearized force, Fcomfort is applied 204. Depicted in this figure are three exemplary values for Fcritical 202A, 202B and 202C. As a general matter, the slope of Fcritical is adjusted by the critically damped coefficient. As the slope of Fcritical decreases, less damping force is applied, the stiffness of the suspension decreases. At greater velocities, Fendstop is applied 206. The controller of the present invention permits each of the operating zones depicted in FIGS. 10A and 10B to have independent slopes and application positions, based on the variables and user-defined (or preset) inputs that control those forces.

Exemplary Control Loops

Figure 7:
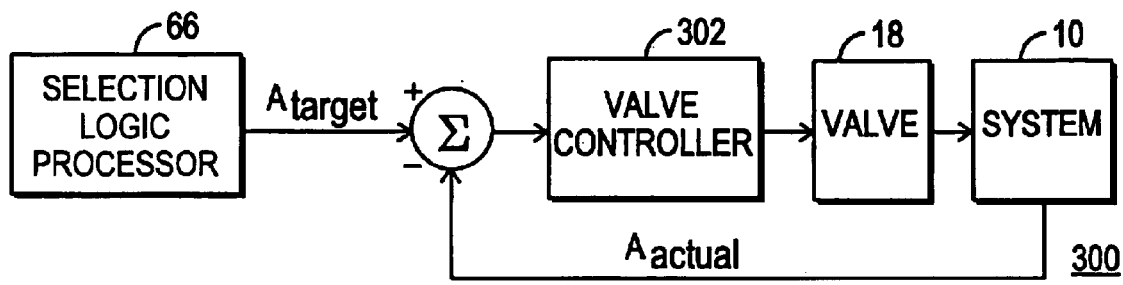
FIG. 7 is an exemplary system-level control loop of the present invention.
Figure 8:
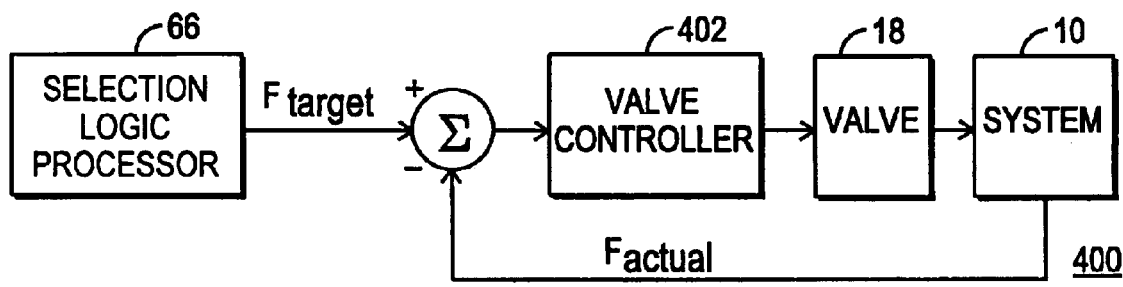
FIG. 8 is another exemplary system-level control loop of the present invention.
Figure 9:
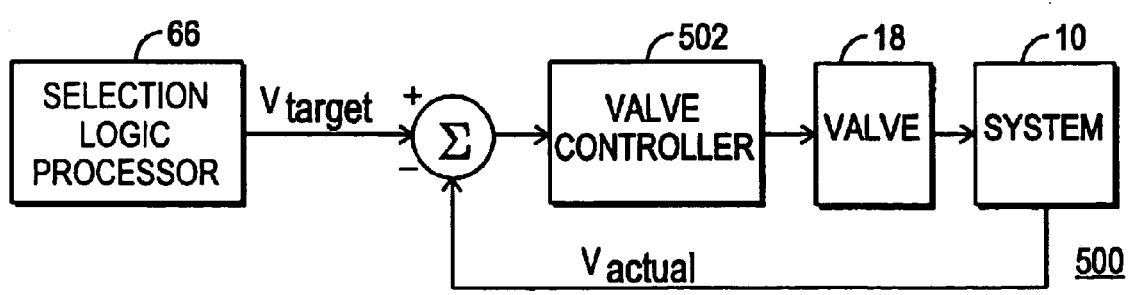
FIG. 9 is another exemplary system-level control loop of the present invention.

FIGS. 7–9 depict exemplary feedback control loops according to the present invention. Those skilled in the art will recognize that the control loops depicted in FIGS. 7–9 are only provided as examples, and such control loops may be constructed in a variety of ways without departing from the present invention.

FIG. 7 depicts a control loop 300 where an outer feedback loop is provided based on target acceleration. The target acceleration is derived from the selection logic 66 (described above). The target acceleration (as modified by the Aactual) is used as a control signal for the valve controller 302, which in turn sets the valve 18 and thereby adjust the energy in the system. Feedback is provided by the system indicative of the actual acceleration (Aactual).

Rather than measuring acceleration the force exerted between the two masses could be measured and controlled with the assumption that the targeted force could be based upon nearly the same rule set as the above method except that the target acceleration is multiplied by the mass to be accelerated along the desired path. This type of control loop 400 is depicted in FIG. 8, where the selection logic derives a target force (Ftarget), and the valve controller 402 responds to this force control signal.

Since acceleration may be difficult to measure (requiring two derivatives) and since the target velocity can be readily computed for the next time step, a control loop based on velocity can be conceived and may be more viable than the inner acceleration loop. This control loop 500 is depicted in FIG. 9, where the valve controller 502 responds to a target velocity Vtarget control signal.

The force loop has the benefit of providing a tight loop limited in bandwidth only by the valve, but requires an additional sensor (i.e., force sensor 24). The acceleration loop requires one less sensor, but the bandwidth of the control system may be limited by the system dynamics of the masses and the ability to compute the acceleration. The velocity loop requires one less sensor as well, and the velocity is a quicker feedback calculation than the acceleration, but may suffer from the bandwidth limitations of the response of the masses. Thus, implementation of the control loop may take into account these considerations, and may be selected based on such bandwidth requirements.

It should be recognized that the controller 50 is also a feedback design in that its inputs are system inputs, and therefore the target acceleration, force, and velocity are changing as the inputs from the system change.

Accordingly, there has been disclosed the math, physics and methods for designing a semi-active shock absorber that simultaneously addresses the performance issues of ride quality, handling and end stop performance. The following is a summary of some of the features of the present invention, and is not intended to limit the present invention.

The invention includes selecting a trajectory based on location in the Displacement/Velocity Plane. The selection of the method to use is such that it chooses the minimum force possible to meet the conflicting requirements of ride quality (damping), handling (vehicle dynamics), and end stop prevention.

Design the selected trajectories to allow returns to ride height alone a path that is tuned to be a fraction of critically damped, to reduce peak force (acceleration), and to prevent hitting the end stop depending on the current location in the Displacement/Velocity plane.

When calculating the endstop force, take into account the absolute velocity of the two masses to earlier anticipate a larger necessary force than calculated by the relative displacement and velocities to prevent hitting the bump stop.

Close the loop on a target force, acceleration or velocity to provide the desired trajectory in the F-V plane by using feedback in force, acceleration or velocity.

Modify the desired trajectory determined from the above rules by reading the acceleration of the sprung mass and deciding if airborne or crossing a deep pot hole to decide whether to allow the two masses to anticipate a hard landing by separating more quickly or to prevent a high force when approaching the droop stop.

Add in an acceleration hedge to insure that the average accelerations of the two masses are matched, but to not couple in too much of the unsprung mass acceleration so as to reduce the value of the isolation provided.

Anticipate a hard landing by prepositioning the valve to an open condition that is closer to the anticipated valve position necessary to control the hard landing.

Provide better ride handling in cornering, braking or acceleration by increasing the fractional damping closer to critical damping as the acceleration due to one of these conditions approaches a preset value.

Those skilled in the art will recognize that numerous modifications may be made to the present invention. All such modifications are deemed within the spirit and scope of the present invention, only as limited by the claims.

What is claimed is:

1. A shock absorber controller for generating a target control signal to adjust the energy in a spring mass system, said spring mass system comprising at least two masses, a spring coupled between said masses and a controllable damper, said shock absorber controller comprising:
   a plurality of inputs configured to receive input signals representing parameters selected from the group consisting of a relative position of said masses, a relative velocity of said masses, accelerations of said masses, a spring constant of said spring mass system, a mass of at least one said masses, a critically damped coefficient of said spring mass system, an upper force threshold for a critically damped force in said spring mass system, and an endstop position of said spring mass system;
   a first processor configured to determine if said spring mass system is compressing or expanding based on at least said relative velocity of said masses with respect to one another;
   at least second and third processors configured to generate control signals to control said controllable damper in said spring mass system in response to at least one of said input signals; and
   a fourth processor configured to select one of said control signals based on said spring mass system compressing or expanding and based on a comparison of said control signals and configured to generate a target control signal based on said selected signal, said target signal being proportional to a desired energy in said spring mass system.

2. The shock absorber controller of claim 1 wherein said second processor is configured to generate a control signal based on at least said relative velocity of said masses and proportional to a damping force to be applied to said spring mass system, and wherein said third processor is configured to generate a control signal to preposition said spring mass system based on said relative position of said masses, said relative velocity of said masses and an acceleration of at least one of said masses.

3. The shock absorber controller of claim 1 wherein said first processor includes a quadrant determination processor configured to generate a quadrant signal representative of a quadrant of operation for said spring mass system based on said relative position and said relative velocity of said masses.

4. The shock absorber controller of claim 1 wherein said second processor includes an inertial endstop processor configured to generate an inertial endstop force signal based on at least said relative velocity and a relative position of said masses with respect to one another, wherein said endstop signal is proportional to an acceleration that allows one of said masses to arrive at a position of minimum travel at approximately zero velocity.

5. The shock absorber controller of claim 4 further comprising a non-inertial endstop processor configured to calculate an absolute velocity and an absolute displacement of said masses with respect to one another, wherein said inertial endstop signal is modified by adding said absolute velocity and said absolute displacement.

6. The shock absorber controller of claim 4 wherein said third processor includes a critically damped processor configured to generate a critical damping force signal proportional to a critical damping force of said spring mass system based on said relative velocity, said spring constant, said critically damped coefficient, and said mass of one of said masses.

7. The shock absorber controller of claim 6 further comprising a pitch and roll processor configured to measure acceleration of at least one of said two masses in the x and/or y direction, wherein said critically damped coefficient is modified based on said measured acceleration.

8. The shock absorber controller of claim 4 wherein said third processor includes a prepositioning processor configured to generate at least one prepositioning signal to preposition said spring mass system based on said relative position, said relative velocity and an acceleration of at least one of said masses.

9. The shock absorber controller of claim 4 further comprising an acceleration hedge processor configured to generate an acceleration hedge signal proportional to the addition of acceleration or force of a first one of said masses to that of the target acceleration or force of a second one of said masses to drive the average acceleration or force of the second mass to approximately equal the actual acceleration or force of the first mass, wherein said fourth processor is configured to add said acceleration hedge signal to said selected signal.

10. The shock absorber controller of claim 1 further comprising a processor configured to derive said relative velocity from said relative position.

11. A shock absorber controller for generating a target control signal to adjust energy in a spring mass system, said shock absorber controller comprising:
    inputs configured to receive system parameter signals from said spring mass system and to receive a comfort force signal proportional to an upper force threshold for a critical damping force;
    a determination processor configured to determine if said spring mass system is compressing or expanding;
    an endstop processor configured to generate an endstop force signal proportional to an endstop damping force;
    a critically damped processor configured to generate a damped force signal proportional to said critical damping force; and
    a selection logic processor configured to select one of said endstop force signal, said damped force signal, or said comfort force signal based on said spring mass system compressing or expanding and based on a comparison of said force signals and to generate a target control signal based on said selected signal, said target signal being proportional to a desired energy in said spring mass system.

12. The shock absorber controller of claim 11 wherein said endstop force signal is based on at least a relative velocity and a relative position of masses in said spring mass system and is proportional to an acceleration that allows one of said masses to arrive at a position of minimum travel at approximately zero velocity.

13. The shock absorber of claim 12 further comprising a non-inertial endstop processor configured to calculate an absolute velocity and an absolute displacement of said masses with respect to one another, wherein said inertial endstop signal is modified by adding said absolute velocity and said absolute displacement.

14. The shock absorber controller of claim 11 wherein said damped force signal is based on a relative velocity of masses in said spring mass system, a spring constant of said spring mass system, a critically damped coefficient of said spring mass system, and a mass of one of said masses.

15. The shock absorber controller of claim 14 further comprising a pitch and roll processor configured to measure acceleration of said spring mass system in the x and/or y direction, wherein said critically damped coefficient is modified based on said measured acceleration.

16. The shock absorber controller of claim 11 further comprising a prepositioning processor configured to generate at least one prepositioning signal to preposition said spring mass system based on a relative position of masses in said spring mass system, a relative velocity of said masses in said spring mass system, and an acceleration of at least one of said masses, and wherein said selection logic processor is configured to select said prepositioning signal based on said spring mass system compressing or expanding and based on a comparison of said control signals.

17. The shock absorber controller of claim 11 further comprising an acceleration hedge processor configured to generate an acceleration hedge signal, wherein said selection logic processor is configured to add said acceleration hedge signal to said selected signal.

18. The shock absorber controller of claim 11 wherein said determination processor is a quadrant determination processor configured to generate a quadrant signal representative of a quadrant of operation for said spring mass system based on a relative position and a relative velocity of masses in said spring mass system.

19. The shock absorber controller of claim 11 wherein said target control signal is a target acceleration signal.

20. The shock absorber controller of claim 11 wherein said system parameter signals represent a relative position of masses in said spring mass system and accelerations of said masses in said spring mass system.

21. The shock absorber controller of claim 20 further comprising a processor configured to derive a relative velocity of said masses from said relative position.

22. A shock absorber control system for adjusting energy in a spring mass system comprising at least two masses, a spring between said masses, and a controllable valve, said shock absorber control system comprising:

sensors for measuring system parameters in said spring mass system including at least a relative position of said masses;

a controller configured to receive said system parameters, to generate a plurality of control signals based on said system parameters, and to generate a target control signal based on a selected one of said control signals, said target control signal being proportional to a desired energy in said spring mass system; and a valve controller configured to control said valve in said spring mass system in response to said target control signal such that said control system operates as a feedback control loop.

23. The shock absorber control system of claim 22 wherein said sensors comprise a relative position sensor for measuring said relative position and accelerometers for measuring an acceleration of each of said masses.

24. The shock absorber control system of claim 22 wherein said controller comprises a first processor configured to determine if said spring mass system is compressing or expanding based on at least a relative velocity of said masses with respect to one another.

25. The shock absorber control system of claim 24 wherein said controller comprises:

at least second and third processors configured to generate said control signals to control said controllable valve in said spring mass system; and a selection logic processor configured to select one of said control signals based on said spring mass system compressing or expanding and based on a comparison of said control signals and configured to generate a target control signal based on said selected control signal, said target control signal being proportional to a desired energy in said spring mass system.

26. The shock absorber control system of claim 22 wherein said controller comprises a processor configured to derive a relative velocity of said masses from said relative position.

27. The shock absorber control system of claim 22 wherein said controller comprises a processor configured to generate at least one prepositioning control signal to preposition said masses, said prepositioning control signal being based on at least said relative position of said masses, a relative velocity of said masses, and an acceleration of at least one of said masses.

28. The shock absorber control system of claim 22 wherein said controller comprises a processor configured to generate at least one force control signal to apply a damping force to said spring mass system, said force control signal being based on at least said relative position of said masses.

29. The shock absorber control system of claim 22 wherein said controller comprises a processor configured to generate an acceleration hedge signal proportional to the addition of acceleration or force of a first one of said masses to that of the target acceleration or force of a second one of said masses to drive the average acceleration or force of the second mass to approximately equal the actual acceleration or force of the first mass, wherein said controller is configured to add said acceleration hedge signal to said selected signal.

30. The shock absorber control system of claim 22 wherein said target control signal is a target acceleration signal proportional.

31. A controller for generating a target control signal to adjust the energy in a spring mass system comprising at least two masses, a spring coupled between said masses, and a controllable valve, said selection logic processor comprising:

means for receiving a quadrant signal, an endstop force signal, a critical damping force signal, a comfort force signal, a valve prepositioning signal, and an acceleration hedge signal;

means for selecting one of said endstop force signal, said critical damping force signal, said comfort force signal, or said valve prepositioning signal based on said quadrant signal and a comparison of said endstop force signal, said critical damping force signal, and said comfort force signal; and means for adding said acceleration hedge signal to a selected one of said endstop force signal, said critical damping force signal, or said comfort force signal.

32. A controller for generating a target inertial and non-inertial energy control signal in a spring/mass shock absorber system comprising two masses coupled together by a spring having a controllable valve to adjust the energy in said system, said controller comprising:

an inertial endstop processor configured to generate an endstop signal based on the relative velocity and relative position of said two masses, said inertial endstop signal comprising a signal that is proportional to the minimum acceleration necessary for one of said masses to arrive at a position of maximum or minimum travel at approximately zero velocity;

a non-inertial endstop processor configured to modify said endstop signal with a signal indicative of the absolute velocity and the absolute displacement of said masses with respect to one another; and a selection processor configured to determine if said endstop signal should be designated as a target control signal for said controllable valve based on the relative velocity of said masses.

33. A controller for generating a target multidimensional damped energy control signal in a spring/mass shock absorber system comprising two masses coupled together by a spring having a controllable valve to adjust the energy in said system, said controller comprising:

a critically damped processor configured to generate a damped signal based on a spring force constant, said damped signal comprising a signal proportional to a damped trajectory of at least one of said masses in the z direction, wherein said damped signal is multiplied by a critically damped coefficient;

a pitch and roll processor configured to modify said critically damped coefficient based on a measured acceleration of at least one of said two masses in the x and/or y direction; and a selection logic processor configured to determine if said damped signal should be designated as a target control signal for said controllable valve.

34. A controller for generating a target direct valve control signal in a spring/mass shock absorber system comprising two masses coupled together by a spring and a controllable valve to adjust the energy in said system, said controller comprising:

a valve prepositioning processor configured to generate a first valve prepositioning signal to bias said valve so that the system anticipates an impulse acceleration that will occur to the system and to generate a second valve prepositioning signal to bias the valve at approximately the open position to allow the mass to freely move apart within the constraints of the system; and a selection logic processor configured to select between said first or second valve prepositioning signals to be designated as a target control signal for said controllable valve.

35. A controller for modifying a valve control signal with an acceleration hedge control signal in a spring/mass shock absorber system comprising two masses coupled together by a spring having a controllable valve to adjust the energy in said system, said controller comprising:

processors configured to generate a plurality of valve control signals based on the relative velocity of said masses;

an acceleration hedge processor configured to generate an acceleration hedge signal proportional to the addition of the acceleration or force of a first one the masses to that of the second one mass to drive the average acceleration or force of the second mass to approximately equal the actual acceleration or force of the first mass; and a selection logic processor configured to add said acceleration hedge signal to a selected one of said valve control signals.

* * * * *